T. J. MELL.
SEPARABLE RIM FOR VEHICLE WHEELS.
APPLICATION FILED DEC. 19, 1905.
960,983.
Patented June 7, 1910.
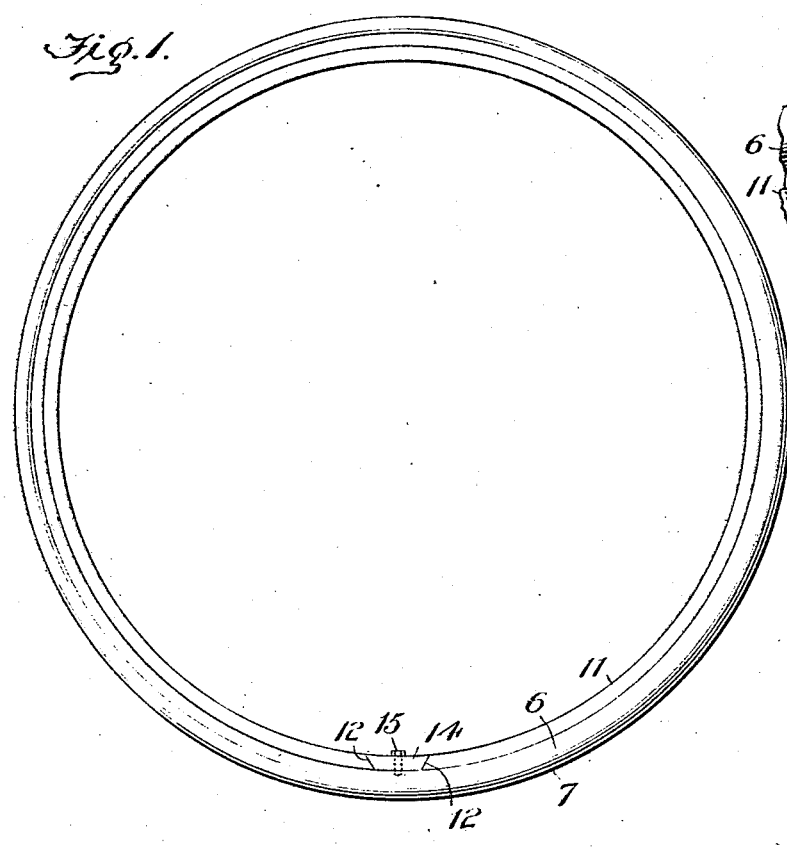
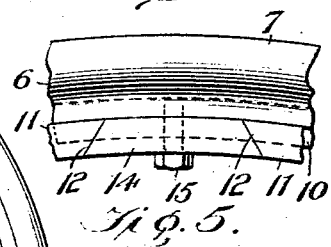
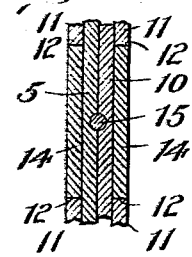
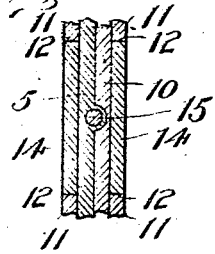
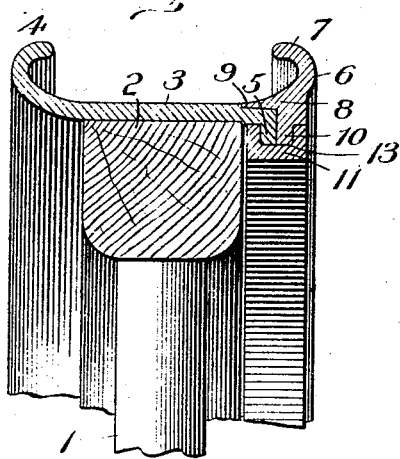
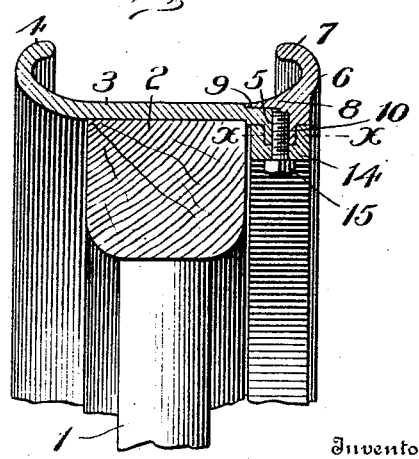

UNITED STATES PATENT OFFICE.

TOD J. MELL, OF YOUNGSTOWN, OHIO, ASSIGNOR TO THE REPUBLIC RUBBER COMPANY, OF YOUNGSTOWN, OHIO, A CORPORATION OF OHIO.

SEPARABLE RIM FOR VEHICLE-WHEELS.

960,983.

Specification of Letters Patent.

Patented June 7, 1910.

Application filed December 19, 1905. Serial No. 292,451.

*To all whom it may concern:*

Be it known that I, TOD J. MELL, a citizen of the United States, residing at Youngstown, in the county of Mahoning and State of Ohio, have invented certain new and useful Improvements in Separable Rims for Vehicle-Wheels; and I do hereby declare the following to be a full, clear, and exact description of the invention, such as will enable others skilled in the art to which it appertains to make and use the same.

My invention relates to vehicle wheels and comprises, more particularly stated, a sectional rim for receiving and detachably retaining pneumatic or other tires such as employed in automobile construction.

The chief object of my invention is therefore to provide means for firmly and securely holding to wheel-rims in operative position, that type of tires known to the trade as "clencher tires," in a manner, which at the same time renders them readily detachable; and my invention consists in the novel form, arrangement, and combination of parts hereinafter described, particularly pointed out and claimed.

In the drawings which form part of this application and whereon corresponding reference characters indicate like parts in the several views: Figure 1 represents in side elevation my improved wheel-rim on a very much reduced scale. Fig. 2 is a transverse sectional view of the rim assembled, showing its relation to the felly and one spoke of the wheel, Fig. 3 is a fragmentary view showing in side elevation that portion of the rim including the locking or key-block and its retaining screw, Fig. 4 is a sectional view similar to Fig. 2, but taken through the locking block and screw aforesaid. Fig. 5 is a horizontal section through the removable rim member and adjacent parts on the line *x—x* Fig. 4, and, Fig. 6 is a view corresponding with Fig. 5 of one modified form of the locking means.

Reference being had to the drawings and numerals thereon, 1 indicates one spoke of a vehicle wheel, and 2 an ordinary felly surrounded by the fixed rim member or section 3, which latter is by preference endless or continuous and shrunk upon its felly 2 or otherwise secured thereto in any approved manner.

One side of the fixed member or section 3 is formed with a continuous curved-over edge 4 designed and adapted to engage the attaching rib or non-elastic bead (not shown) of the well known form of clencher-tires. The opposite side of said section 3 is finished by an inturned angular and annular flange 5 as shown by Figs. 2 and 4, the function whereof will later appear. Adjacent to this flange 5 is located the detachable rim section 6 also fitted with a continuous curved-over edge 7 corresponding with that numbered 4, and coacting therewith to clench and retain a tire in operative position by similarly engaging its opposite attaching rib or non-elastic bead. The base 8 of the rim section 6 finds a support in a slightly depressed seat 9 upon the periphery of fixed section 3, and is provided with an inturned ridge or flange 10 corresponding with that numbered 5 against which it snugly fits.

Embracing the flanges 5 and 10 is an open resilient ring 11 having converging ends 12—12, and channeled upon its exterior surface as at 13. Between the angular ends of ring 11 is located a locking or key block 14 the ends whereof correspond with those of said ring, this block being drawn into and retained in position by means of a bolt or machine screw 15 passing therethrough and threaded into or between flanges 5—10 of the rim sections as indicated by the drawings and particularly by Figs. 4, 5 and 6 thereof.

This being a general description of my invention in its preferred form of construction, it will be here noted that same may be variously changed and modified to meet special requirements of tires and wheels without in the least departing from the spirit of my invention as hereinafter claimed. For example, ring 11 may be either an expansion or a compression ring, or its sectional contour may be variously altered so long as its function as a locking ring is not destroyed. Likewise the retaining screw 15 may be threaded into a hole formed partly in both flanges 5 and 10 as shown by Fig. 5; or, as illustrated by modified Fig. 6, it may be threaded into a lug formed upon one of said flanges and recessed into the other of said flanges; or in some instances the screw or bolt 15 may be embedded in the flange or flanges and provided with a nut for the purpose of seating and retaining the locking or key-block 14.

The operation of assembling the several parts of my invention when constructed and arranged as illustrated may be briefly stated as follows: The bead or non-elastic base at one side of the outer case or sheathing of a tire is first engaged by the curved-over edge 4 throughout its circumference. The corresponding curved-over edge 7 upon the detachable rim section 6 is next brought into similar engagement with the opposite bead or base of said tire, whereupon flanges 5 and 10 upon the fixed and detachable rim sections, respectively, are in close contact as shown by Fig. 2. At this juncture the resilient locking ring 11 is circumferentially compressed or sprung together until its ends 12—12 abut, whereupon, owing to its decreased diameter, same may readily be passed within the confines of flanges 5—10. This ring is then permitted to expand, or is positively expanded, until it snugly embraces within its channel 13 the aforesaid flanges, and is there positively keyed in locked position by agency of the block 14 introduced between its ends 12—12. Retaining screw 15 is now employed to complete the operation. This single screw passing radially through said block 14, engages in screw threaded relation the flanges 5—10, thereby serving to effectively draw said block to its seat as shown by Figs. 3, 4, and securely interlock flanges 5—10 of the fixed and detachable rim sections 3, 6, respectively, against accidental dislodgment.

Having thus described my invention, what I claim and desire to secure by Letters Patent is:

1. In a vehicle wheel, the combination with relatively fixed and detachable rim sections, of a circumferential flange upon each of said sections, a locking ring for embracing and locking said flanges together, and a block for keying said ring in a locking position, substantially as described.

2. In a vehicle wheel, the combination with relatively fixed and detachable rim sections, of a circumferential flange upon each of said sections, a resilient ring for interlocking with said flanges, a block for keying said ring in a locking position, and means for securing said block, substantially as described.

3. In a vehicle wheel, the combination with separable rim sections each having a circumferential locking flange, of an open resilient ring adapted to interlock with said flanges, a key block adapted to expand said ring into its locked position, and a retaining screw for securing together the aforesaid block, flanges, and ring, substantially as described.

In testimony whereof I affix my signature, in presence of two subscribing witnesses.

TOD J. MELL.

Witnesses:
JOHN CLIFFORD,
R. R. WILSON.